UNITED STATES PATENT OFFICE.

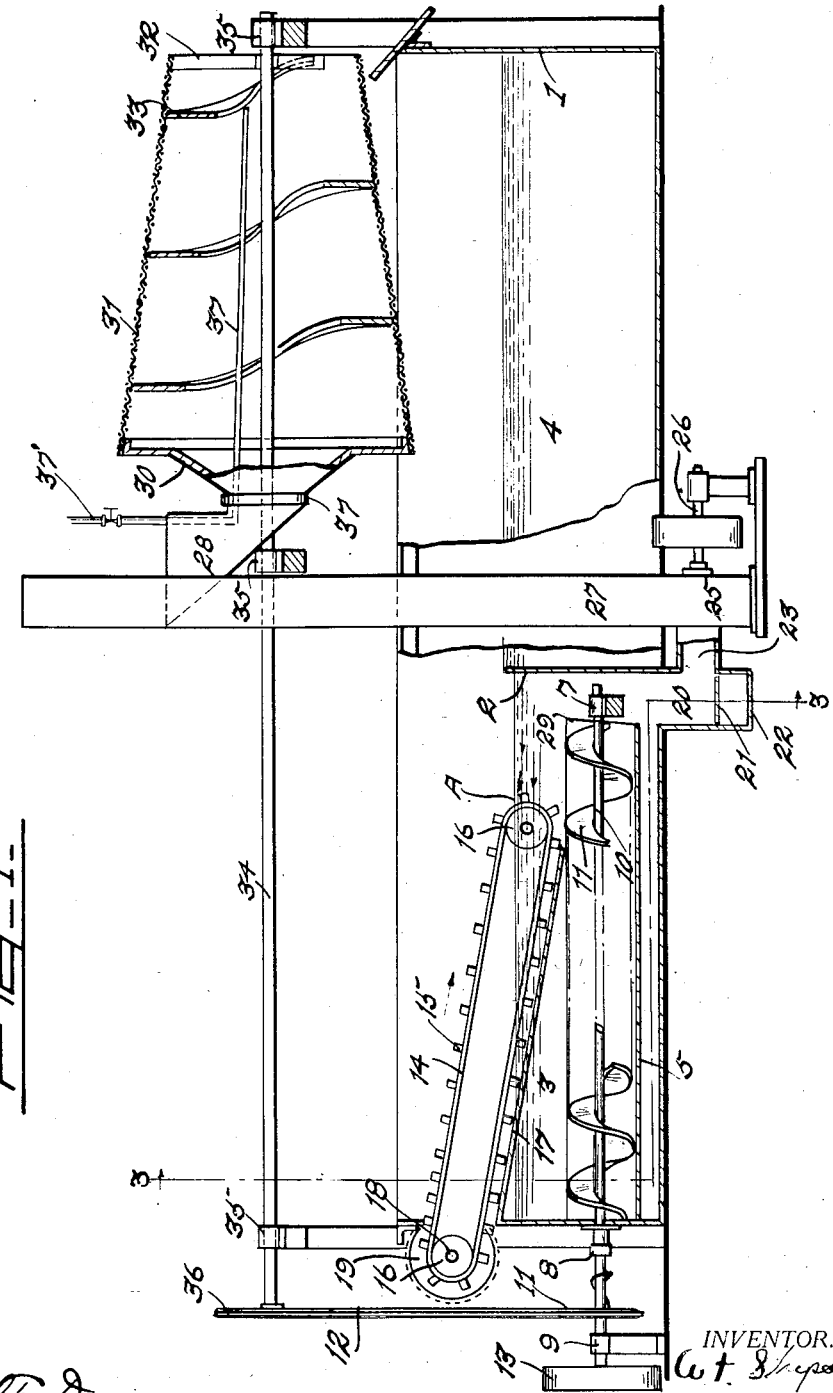

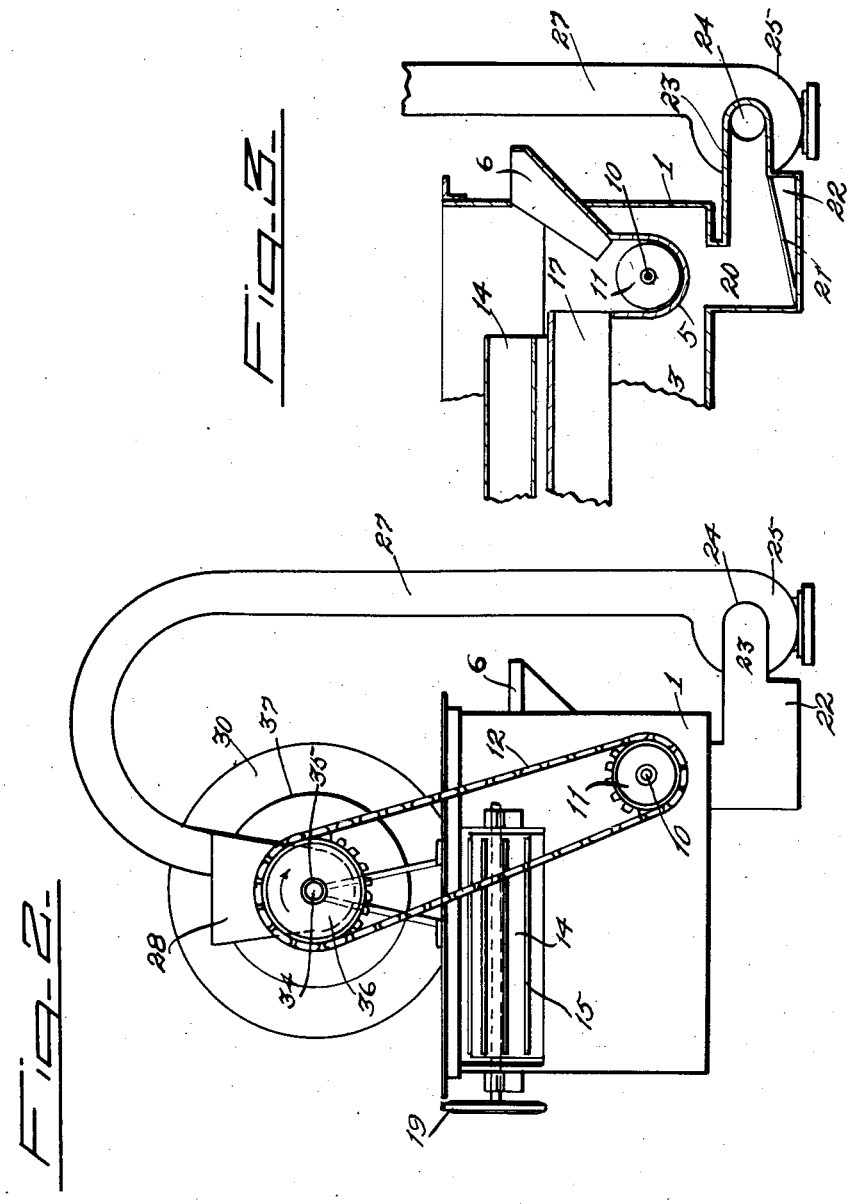

ARTEMAS P. SHEPARD, OF FRESNO, CALIFORNIA.

APPARATUS FOR TREATING RAISINS.

1,269,966. Specification of Letters Patent. Patented June 18, 1918.

Application filed February 19, 1918. Serial No. 218,032.

*To all whom it may concern:*

Be it known that I, ARTEMAS P. SHEPARD, a citizen of the United States, residing at Fresno, in the county of Fresno and State of California, have invented certain new and useful Improvements in Apparatus for Treating Raisins, of which the following is a specification.

In the processing of raisins, particularly after the same have been dried, it is found desirable to wash the dried raisins in order to remove therefrom the stems and other foreign matter which have become intermixed therewith during the open air drying thereof.

The present invention relates to an apparatus designed for the washing of dried raisins and wherein the raisins are immersed in a body of water and are gradually conveyed therein and agitated to release or free the foreign material therefrom, and enable the light particles of said material to float on said body of water from which it is removed. A further object is to subject the raisins to a further stage or operation, wherein the same are removed from said body of water, preferably by a centrifugal pump, and are deposited on a screen or other agitating member, and while thereon are subjected to fluid under pressure for further removing foreign material therefrom.

The invention consists broadly in a receptacle divided into a plurality of tanks, one of which carries the raisin receiving, conveying and agitating means, which is submerged below the level of a fluid therein, and said tank also being provided with means for removing the lighter particles, adapted to float on the surface of the fluid, therefrom. The other tank communicates with the first mentioned tank through a suitable duct within which is mounted a centrifugal pump which draws the partially washed raisins and the water from the first tank and discharges the same at a point above the second tank and into a suitable screen for further agitating and treating of the raisins.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference should be had to the accompanying sheets of drawings, wherein—

Figure 1 is a view in longitudinal section of the preferred embodiment of my invention, illustrating the two tanks and the arrangement of the elements relatively thereto.

Fig. 2 is a view in end elevation.

Fig. 3 is a sectional view taken on line 3—3 of Fig. 1, viewed in the direction of the arrows.

Referring more particularly to the several views of the drawings, wherein like characters of reference designate corresponding parts, 1 indicates a suitable open topped elongated receptacle divided by the transverse partition 2 which falls short of the top edge of the receptacle 1 and which divides the interior thereof into a washing tank 3 and settling tank 4.

Extending longitudinally of the washing tank 3, and preferably positioned adjacent one of the side walls thereof, is a substantially U-shaped open top trough 5 with one end of which communicates a feed chute 6 leading exteriorly of said tank and into which the dried raisins to be washed are deposited in any suitable manner.

Extending longitudinally of the trough 5, and mounted at its opposite ends in bearings, as at 7, 8 and 9, is a shaft 10, carrying a worm 11 of a diameter substantially the same as that of the interior of the trough 5. The end of the shaft 10 carries a sprocket 11 around which extends a chain 12, said shaft being rotated by power applied to a sprocket 13.

On the rotation of the shaft 10 in the direction of the arrows, Fig. 1, the raisins received through the feed opening 6 into one end of the trough 5, are conveyed longitudinally of the trough and are agitated during their travel, which agitation frees the foreign particles and stems therefrom and the lighter free material floats to the surface of the water level in said tank, which is preferably maintained at the level of the line A. The light particles of material floating on the surface of the water in the tank 3 are removed therefrom by a suitable conveyer composed of the flexible base member 14 and the transverse members 15, said base operating around supporting rolls 16 and arranged at an inclination within the tank. The lower flight of said conveyer is adapted to overlie a supporting plate 17 with the edges of the transverse members in contact with the upper surface thereof. Thus it will be apparent that on the movement of the conveyer in the direction of the arrows, Fig. 2, the material maintained in suspension within the washing tank 3, adjacent the level of the fluid therein, will be caused by the action of the transverse members to be conveyed upwardly over said plate 17 and discharged from the tank 3 at the upper end of said plate. The upper roll 16 is mounted on a rotatable shaft 18 supported in bearings and said shaft carries at its end a sprocket 19 driven by power through any suitable source.

At the discharge end of the trough 5, the washing tank 3 is provided in its base with a sump 20, at the lower end of which is positioned the inclined screen or perforated plate 21 which provides a trap 22 in the bottom of said sump. Extending from said sump at a point above the trap therein is a duct 23 communicating with the inlet 24 of a pump casing 25 within which is mounted, on the shaft 26, a suitable rotary pump member, not shown, and from said casing extends the vertical pump discharge duct 27 terminating at its upper end in a hopper 28 positioned at a point above the settling tank 4.

On the conveying of the raisins beyond the open discharge end 29 of the trough 5, the same are discharged into the sump 20 and onto the screen or perforated plate 21. The suction of the pump draws the raisins and water from the sump 20 through the inlet 23 and elevates the same in the duct 27, discharging the water and raisins into the hopper 28.

During the withdrawal of the raisins from the sump 20, the same pass upwardly over the screen 21, enabling the heavier foreign material intermixed therewith, such as nails, grit, etc., to pass from the screen or plate 21 and be received in the trap 22. By employing the centrifugal pump in the removing of the raisins from the tank 3 and conveying and elevating the same into the hopper 28, the raisins are thus retained in a volume of water, and during their course of travel are prevented thereby from becoming injured.

The hopper 28 communicates with the feed end plate 30 of a revolving screen 31 open at its discharge end, as at 32, and provided with a spiral conveying rib 33 therein.

Extending through the screen 31 is the screen supporting shaft 34 rotatably mounted in bearings 35 and carrying at one end the sprocket 36 over which operates the chain 12. Suitable spiders support the end plate 30 and screen 31 on the shaft 34 to maintain the same in rotative engagement with the shaft, and a running joint 37 is provided between the end plate 30 and the base of the hopper 28.

The raisins discharged into the hopper 28, together with the water removed from the tank 3 and elevated by the pump, pass from the hopper 28 into the revolving screen 31 and during the rotation of said screen the raisins are conveyed toward the discharge end of the screen by the rib 33, and during said conveying are subjected to a stream of wash water issuing from the pipe 37 disposed longitudinally within the screen 31. Thus, it will be apparent that the raisins are agitated while conveyed toward the discharge end of said screen and are subjected to a stream of wash water during such agitation and travel, whereby the foreign particles which have continued to adhere thereto and intermix therewith are separated therefrom and pass with the wash water into the settling tank 4, settling in the bottom thereof.

The operation of the screw 11 to move the raisins toward the discharge end of the trough 5 and the withdrawal by the centrifugal pump from the tank 3 and the delivering of the same into the tank 4 through the hopper 28 maintains the level of the water in the settling tank 4 slightly above that in the washing tank 3, the excess water in the tank 4 flowing over the wall 2 and maintaining a current or circulation adjacent the level A of the water in the tank 3 in the direction of the arrows, Fig. 1, which causes the particles floating in the water in the tank 3 to be conveyed upwardly over the plate 17. The refuse in the trap 22 is removed therefrom at intervals, as is that settling in the tank 4.

It is apparent that the above described apparatus may be utilized for the treating and washing of raisin seeds for cleaning the same and recovering therefrom the fruit adhering thereto, the cleaned seeds being utilized for commercial purposes and the wash water with the fruit pulp being utilized for the recovery of the alcohol contained therein.

Having thus described my invention, what I claim as new and desire to protect by Letters Patent is:—

1. An apparatus for the washing of raisins and the like, comprising a fluid containing tank for the receiving of raisins to be washed, means therein for conveying the raisins longitudinally thereof and for maintaining the same agitated to permit the lighter particles to separate therefrom, means for removing the lighter particles from the surface of the fluid in said tank and for discharging the same exteriorly of said tank, a sump for receiving the raisins after the same are conveyed longitudinally of the tank, a screen within said sump and on which the raisins are deposited, a trap below said screen for receiving the foreign material passing therethrough, and a pump for removing the raisins from the surface of said screen.

2. An apparatus for washing raisins and the like, comprising a fluid containing tank, a trough extending longitudinally thereof for receiving the rasins to be washed, said trough open at its top and at its discharge end, a screw conveyer in said trough for conveying the raisins therein longitudinally thereof and maintaining the same in agitation, an endless elevating conveyer extended into the fluid within said tank for removing therefrom the foreign material in suspension therein, a settling tank adjacent said washing tank, a centrifugal pump for removing the washed raisins and fluid from said washing tank, a screen associated with said settling tank and onto which said pump discharges, the fluid with the sediment contained therein passing through said screen, the sediment settling within said settling tank and the excess fluid overflowing into said washing tank.

3. An apparatus for the washing of raisins and the like, comprising a liquid containing washing tank for receiving the raisins to be washed, means within the tank for conveying raisins therein longitudinally thereof and for maintaining the same in agitation, whereby the released lighter foreign particles will float to the surface of the liquid therein, means within said tank for removing the floating particles from the surface of the liquid therein, a settling tank adjacent said washing tank, a screen associated with the settling tank, a duct connecting the base of the washing tank and discharging into said screen, and a centrifugal pump within said duct for withdrawing the raisins and fluid from said washing tank and for depositing the same on said screen, the raisins passing over said screen and the fluid and foreign particles passing through the screen, the foreign particles settling in said settling tank and the excess water therein overflowing from said tank into said washing tank.

4. An apparatus for washing raisins and the like, comprising liquid containing washing and settling tanks, means within the washing tank for agitating and conveying raisins deposited therein longitudinally thereof, means within said tank for removing therefrom foreign material separated from the raisins and floating on the surface of the liquid therein, means for removing the washed raisins from said tank and for conveying the same to a point within the sphere of said settling tank, a screen for receiving said raisins, and means for further washing the said raisins when supported by said screen, whereby the foreign particles removed therefrom and said wash water pass into said settling tank permitting the settling of the foreign material in said tank and the excess water in said tank to overflow into said washing tank.

In testimony whereof I have signed my name to this specification in the presence of two subscribing witnesses.

ARTEMAS P. SHEPARD.

Witnesses:
N. A. ACKER,
D. B. RICHARDS.